United States Patent
Shinonaga et al.

(10) Patent No.: US 7,151,484 B2
(45) Date of Patent: Dec. 19, 2006

(54) PULSE COMPRESSION PROCESSOR

(75) Inventors: Mitsuyoshi Shinonaga, Yokohama (JP); Shinkichi Nishimoto, Hachioji (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 139 days.

(21) Appl. No.: 10/951,674

(22) Filed: Sep. 29, 2004

(65) Prior Publication Data

US 2005/0068226 A1    Mar. 31, 2005

(30) Foreign Application Priority Data

Sep. 30, 2003 (JP) ............................ 2003-342153

(51) Int. Cl.
*G01S 7/32*    (2006.01)
*G01S 7/28*    (2006.01)
*G01S 13/00*    (2006.01)

(52) U.S. Cl. .................... 342/204; 342/89; 342/128; 342/131; 342/132; 342/134; 342/135; 342/159; 342/175; 342/195; 342/196; 342/202

(58) Field of Classification Search ................ 342/118, 342/128–132, 134–144, 175, 192–197, 201–205, 342/89–103, 159–164, 189
See application file for complete search history.

(56) References Cited

U.S. PATENT DOCUMENTS

| | | | | |
|---|---|---|---|---|
| 3,680,105 A | * | 7/1972 | Goldstone | 342/194 |
| 4,095,225 A | * | 6/1978 | Erikmats | 342/195 |
| 4,153,900 A | * | 5/1979 | Novak et al. | 342/201 |
| 4,359,736 A | * | 11/1982 | Lewis | 342/201 |
| 4,521,779 A | * | 6/1985 | Lewis | 342/194 |
| 4,591,857 A | * | 5/1986 | Thor | 342/201 |
| 4,833,479 A | * | 5/1989 | Carlson | 342/194 |
| 5,036,328 A | * | 7/1991 | Nakamura et al. | 342/204 |
| 5,229,775 A | * | 7/1993 | Sakamoto et al. | 342/201 |
| 5,309,161 A | * | 5/1994 | Urkowitz et al. | 342/132 |
| 5,414,428 A | * | 5/1995 | Gallagher et al. | 342/132 |
| 5,440,311 A | * | 8/1995 | Gallagher et al. | 342/132 |
| 5,938,611 A | | 8/1999 | Muzilla et al. | |
| 6,067,043 A | * | 5/2000 | Faure et al. | 342/202 |
| 6,208,285 B1 | * | 3/2001 | Burkhardt | 342/132 |

FOREIGN PATENT DOCUMENTS

EP    1 164 385 A2    12/2001
JP    4-357485         12/1992

OTHER PUBLICATIONS

Mitsuyoshi Shinonaga, et al., "New Pulse Compression Filter to Realize Minimum S/N Loss With Zero Range Sidelobe", The Institute of Electronics, Information, and Communication Engineerings Transactions on Communications (Japanese Edition), vol. J87-B No. 7, Jul. 2004, pp. 1000-1008.

(Continued)

*Primary Examiner*—Bernarr E. Gregory
(74) *Attorney, Agent, or Firm*—Oblon, Spivak, McClelland, Maier & Neustadt, P.C.

(57) ABSTRACT

A pulse compression processor 20 compressing a modulated pulse signal correlately received by a receiver, includes a coefficient calculator 30 calculating a set of filtering coefficients for converting sampled output signal values outside a vicinity of main-lobe of a compressed pulse signal into zero as well as for minimizing S/N loss in a peak value of the main-lobe, and a pulse compression filter 40 compressing the modulated pulse signal based on the set of the filtering coefficients calculated by the coefficient calculator.

9 Claims, 6 Drawing Sheets

OTHER PUBLICATIONS

Shinkichi Nishimoto, "Time Sidelobe Suppression for Coded Pulse Compression via Nonlinear Optimization Method", Electronics and Communications in Japan, part 1, vol. 72, No. 1, XP-000037792, Jan. 1989, pp. 1-9.

* cited by examiner

PULSE COMPRESSION PROCESSOR

BACKGROUND OF THE INVENTION

1. Field of the Invention

This invention relates to pulse compression processors used for receivers of radars, and more specifically, to techniques for realizing pulse compression of the received signals with sidelobe-free as well as minimum S/N loss.

2. Description of the Related Art

A radar signal processor adopting a pulse compression method used for radars is shown in Japanese Patent Application Laid-Open H04-357485. This radar signal processor which transmits chirp signals (linear FM modulated signals) as transmission signals to relatively moving targets detects the targets from the Doppler frequency components extracted from the signals reflected by the targets.

This pulse compression method is used for converting chirp signals received by a receiver into short pulse signals by pulse compression filters matching these chirp signals. Therefore, since the method has some advantages such as longer distance detection, higher range resolution, and interference signal suppression, it is applied to many radar systems.

Such a conventional radar, called chirp radar, generally has performances evaluated by the shape of the compressed pulse signal, in particular, the width of a main-lobe (main-lobe width) and the level of sidelobe (sidelobe level), and the amount of S/N loss in the peak value of main-lobe.

As is well known, in general, main-lobe width is preferable to be narrow because of the increase of radar resolution. Further, a sidelobe level that indicates pseudo targets such as ghost echoes and clutters is preferable to be low. Of course, although S/N loss that deteriorates radar sensitivity is clearly preferable to small, the increase of the transmitted power in order to keep radar sensitivity is generally very expensive.

In the process of pulse compression, the signals received by a receiver are usually weighted by window functions to suppress the sidelobe level of the received signals (see Section 4.6.3 in the text entitled "Radar Handbook", $2^{nd}$ Edition, written by M. I. Skolnik, published by McGraw-Hill, Inc. (1990)). Typical window functions have properties shown in Table 10.8 in the text quoted above. However, the suppression of sidelobe level increases S/N loss because main-lobe width becomes broadened. This leads us to the finding of the complementary relationship between main-lobe width and sidelobe level. Thus, when designing radar systems, we are forced on the trade-off between them.

There are other methods for suppressing sidelobe level as follows: first, constructing inverse filters that minimize mean squared errors from the expectation shape of the correlation output of the compressed pulse signals with desired sidelobe level; secondly, subordinately connecting sidelobe eliminating filters to pulse compression filters, and thirdly, subtracting correlation output with one sample shifts from the correlation output of the compressed pulse signals. However, since these methods aim at only sidelobe suppression, they do not assure the minimization of S/N loss because they consider the S/N loss calculated after the filter design finished.

Additionally, the following techniques are already known: first, in binary phase code modulating method, minimizing S/N loss with allowable maximum peak sidelobe level; and secondly, in the same method, minimizing peak sidelobe level with desired S/N loss. In these techniques, the method of steepest descent is used for obtaining an optimum solution of S/N loss or peak sidelobe level. However, it is hard to converge them with optimum solutions because computational efforts increase with the increase of the length of input code sequences, which are complex numbers, in the method of steepest descent.

SUMMARY OF THE INVENTION

To address the issues described above, this invention provides high-performance pulse compression processors for realizing sidelobe-free as well as high resolution and sensitivity, that is, realizing zero sidelobe level with minimum S/N loss.

According to main aspect of the present invention, there is provided a pulse compression processor compressing a modulated pulse signal correlately received by a receiver, comprising: a coefficient calculator calculating a set of filtering coefficients for converting sampled output signal values outside a vicinity of main-lobe of a compressed pulse signal into zero as well as for minimizing S/N loss in a peak value of the main-lobe; a pulse compression filter compressing the modulated pulse signal based on the set of the filtering coefficients calculated by the coefficient calculator.

DETAILED DESCRIPTION OF THE PREFERRED EMBODIMENTS

Hereinafter, we shall provide detailed explanations of pulse compression processors according to the first and second embodiments of the present invention with reference to the drawings.

Figure 1:
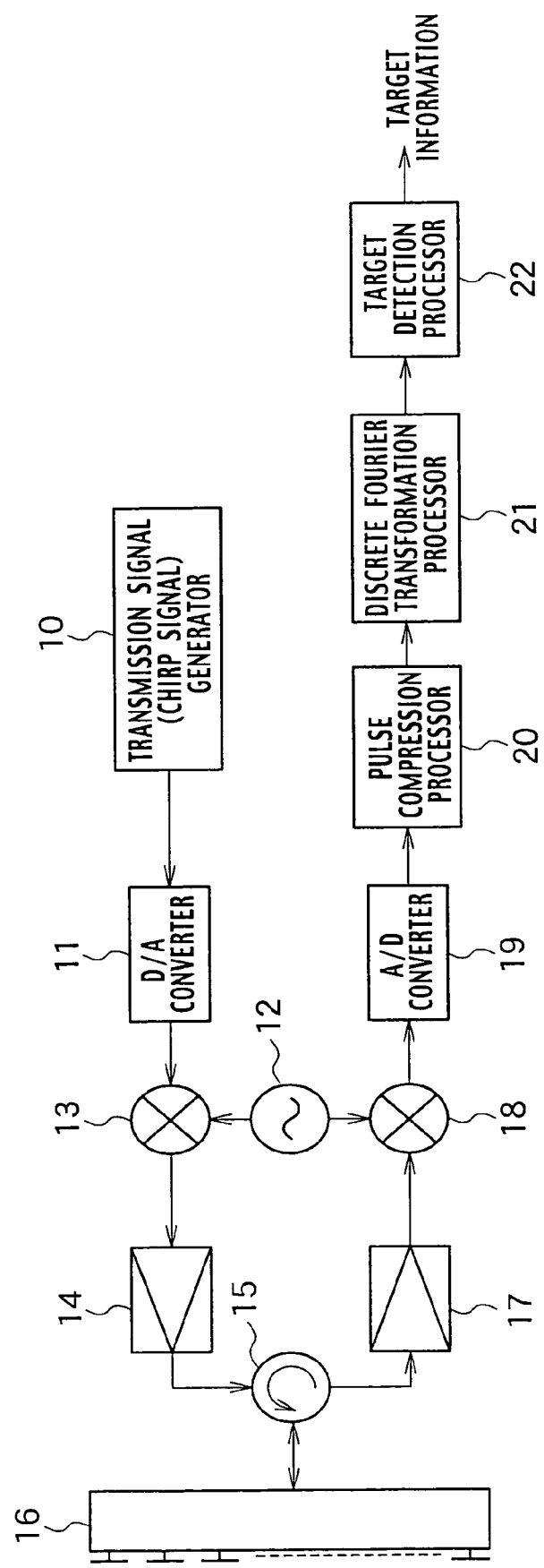
FIG. 1 is a functional block diagram showing a radar signal processor adopting a pulse compression processor according to the first embodiment of the present invention.

First, let us explain the schematic construction of a radar signal processor adopted with a pulse compression processor according to the first and second embodiments of the present invention with reference to FIG. 1.

As shown in FIG. 1, this radar signal processor of the present invention comprises a transmission signal generator 10, a D/A converter 11, a local oscillator 12, a transmission side mixer 13, a transmission signal amplifier 14, a circulator 15, an antenna 16, a reception signal amplifier 17, a reception side mixer 18, an A/D converter 19, a pulse compression processor 20, a Discrete Fourier Transformation (DFT) processor 21, and a target detection processor 22.

Figure 2A:
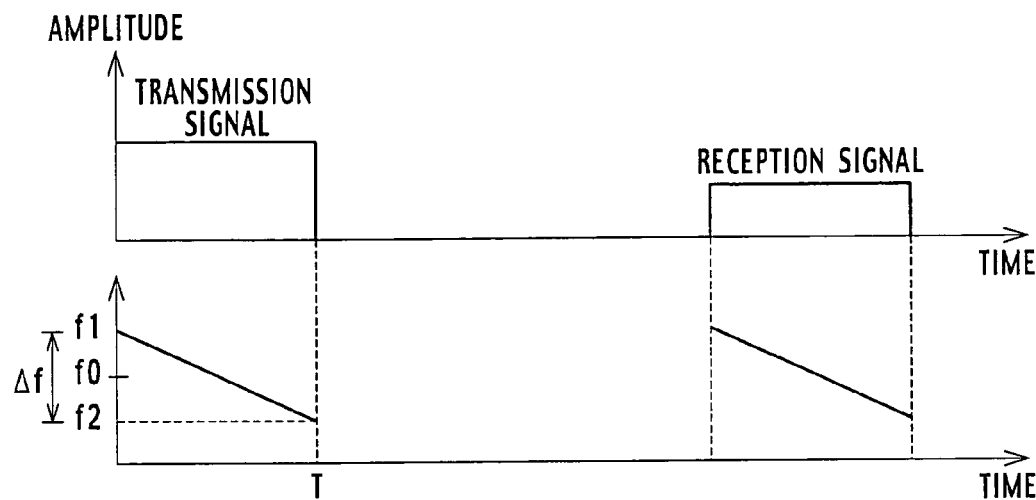
FIG. 2A is a graph showing chirp signals modulated by a transmission signal generator and transmitted to a pulse compression processor according to the first and second embodiments of the present invention.

The transmission signal generator 10 generates a transmitting signal, with a Pulse Repetition Frequency (PRF), that consists of the time series of a long pulse with wide frequency bandwidth broadened by modulation processing. This transmission signal is called chirp signal. For instance, FIG. 2A shows chirp signals with a pulse width T ($>>\tau$) and a frequency bandwidth $\Delta f$ ($=1/\tau$).

The D/A converter 11 converts the chirp signal transmitted from the transmitting signal generator 10 into an analog signal.

The local oscillator 12 generates a local signal (synchronization signal) with a local frequency.

The transmission side mixer 13 transforms the analog signal transmitted from the D/A converter 11 into a high frequency signal by mixing the analog signal with the local signal transmitted from the local oscillator 12.

The transmission signal amplifier 14 amplifies the high frequency signal transmitted from the transmission side mixer 13 until reaching desired level.

The circulator 15 switches outputting the amplified high frequency signal transmitted from the transmission signal amplifier 14 to the antenna 16 and outputting a reflected signal received by the antenna 16 to the reception signal amplifier 17.

The antenna 16, which is composed of, for instance, an array antenna, transmits the high frequency signal transmitted from the transmission signal amplifier 14 via the circulator 15 to a relatively moving target as well as receives the signal reflected by the target.

The reception signal amplifier 17 amplifies the reception signal (reflection signal) transmitted from the antenna 16 via the circulator 15 with low noise.

The reception side mixer 18 mixes the amplified signal transmitted from the reception signal amplifier 17 with the local signal transmitted from the local oscillator 12, resulting in converting the amplified signal into an intermediate frequency signal, called IF signal.

The A/D converter 19 converts the IF signal transmitted from the reception side mixer 18 into an orthogonal digital signal, called I/Q signals.

Figure 2B:
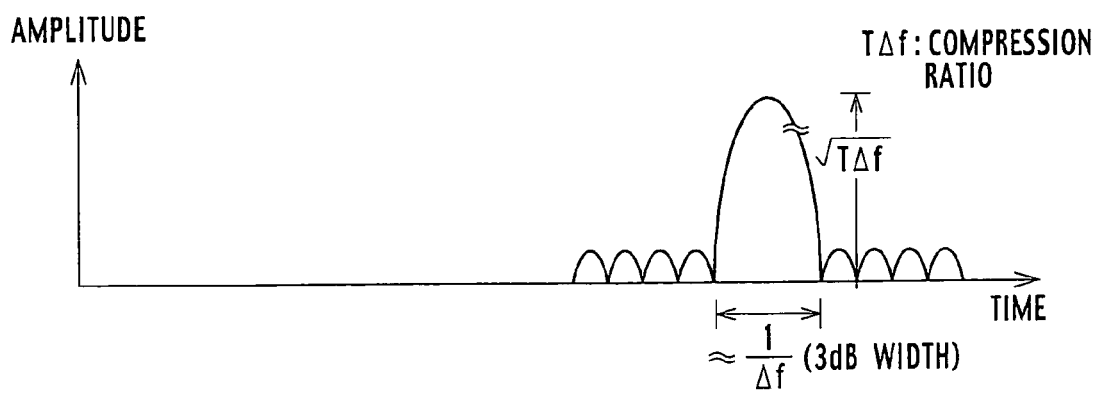
FIG. 2B is a graph showing a pulse shape compressed by a pulse compression processor according to the first and second embodiments of the present invention.

The pulse compression processor 20, which corresponds to the pulse compression processor of the present invention, compresses the I/Q signal transmitted from the A/D converter 19. As will hereinafter be described in detail, this pulse compressing method is a technique for converting the long pulse signal modulated by the transmission signal generator 10 as transmitted into a short pulse signal by executing correlation processing in a range (distance) direction as received. FIG. 2B shows an example of a pulse shape compressed by this technique.

The DFT processor 21 transforms time domain data of the compressed I/Q signal transmitted from the pulse compression processor 20 into frequency domain data by calculating the Fourier transformation of the compressed I/Q signal. In other words, the DFT processor 21 decomposes the frequency domain data into Doppler frequency components that are the velocity components of the target.

The target detection processor 22 detects the target from the Doppler frequency components extracted from the frequency domain data transmitted from the DFT processor 21.

<First Embodiment>

Figure 3:
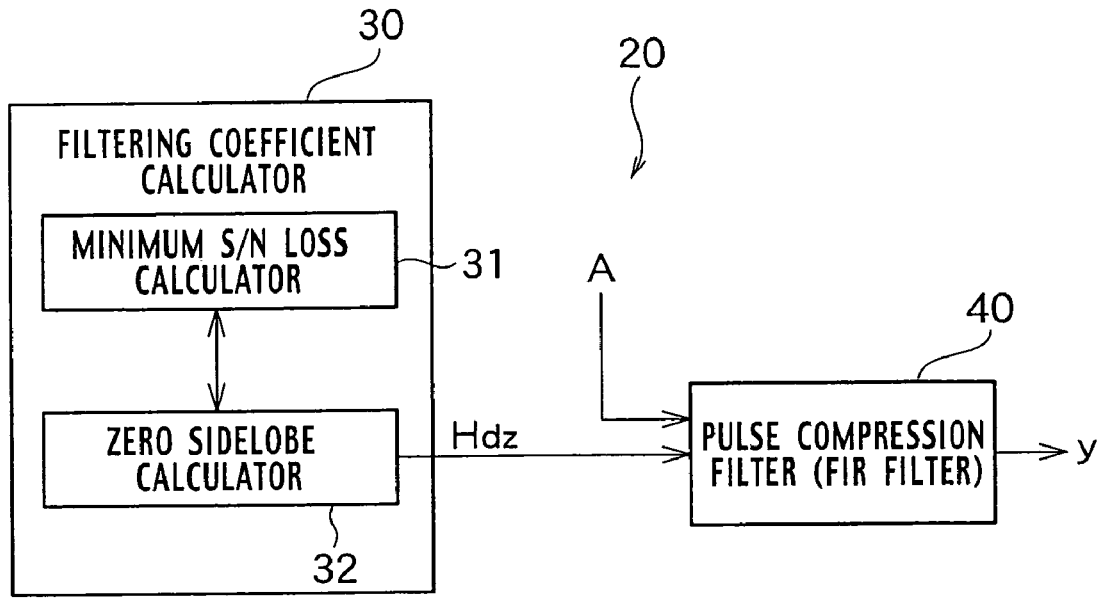
FIG. 3 is a functional block diagram showing a pulse compression processor according to the first embodiment of the present invention.

Let us provide detailed explanations of a pulse compression processor according to the first embodiment of the present invention with reference to FIG. 3.

As shown in FIG. 3, the pulse compression processor 20 comprises a filtering coefficient calculator 30 and a pulse compression filter 40. Further, the filtering coefficient calculator 30 includes a minimum S/N loss calculator 31 and a zero sidelobe calculator 32.

The filtering coefficient calculator 30 calculates a first coefficient vector $\vec{H}_{dz}$ provided to the pulse compression filter 40. Namely, the minimum S/N loss calculator 31 calculates second coefficient data that theoretically minimizes S/N loss, and the zero sidelobe calculator 32 calculates first coefficient data as the first coefficient vector $\vec{H}_{dz}$ for reducing sidelobe level to zero, called sidelobe free, based on the second coefficient data as a second coefficient vector $\vec{H}_{zM}$ calculated by the minimum S/N loss calculator 31.

Figure 4:
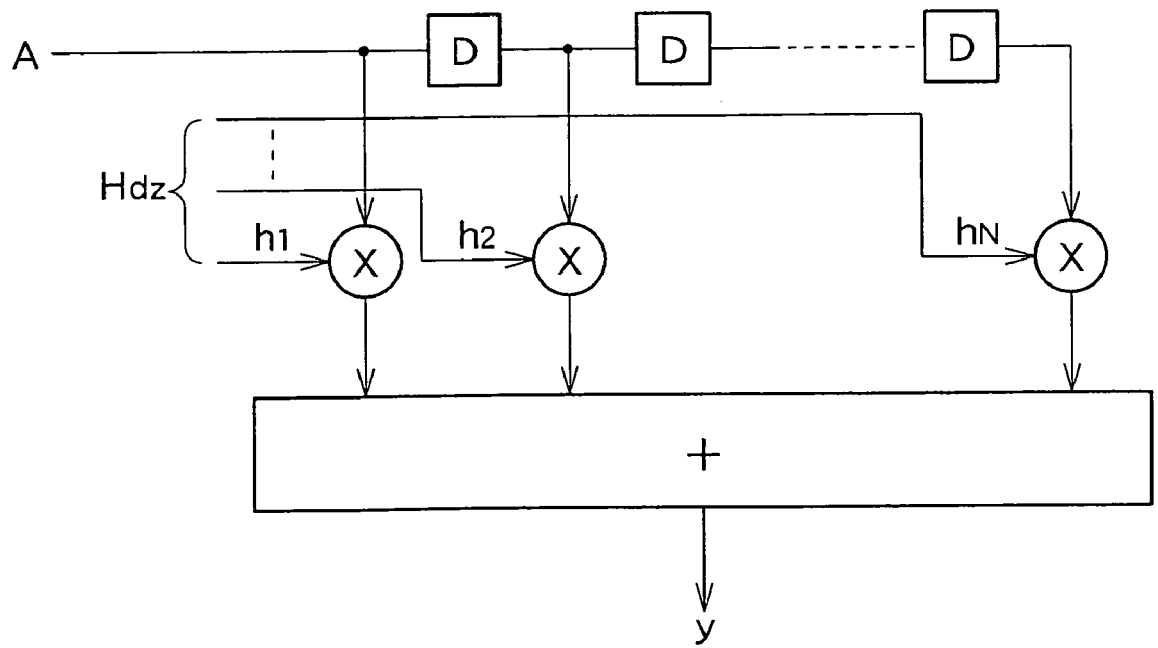
FIG. 4 is a functional block diagram showing a construction of a FIR filter used as a pulse compression filter of a pulse compression processor according to the first embodiment of the present invention.

The pulse compression filter 40 comprises, for example, a Finite Impulse Response (FIR) filter having the well known structure including delay elements (D), multipliers (x), and accumulators (+) as shown in FIG. 4. The pulse compression processor 40 compresses the I/Q signal transmitted from the A/D converter 19, based on the first coefficient vector $\vec{H}_{dz}$ transmitted from the filtering coefficient calculator 30.

Next, let us explain the calculation process of the first coefficient vector $\vec{H}_{dz}$ in the filtering coefficient calculator 30, in particular, the derivation of a pulse compression condition for satisfying the sidelobe free, called sidelobe free condition.

[Principle of Pulse Compression Processing]

In the pulse compression processor 20, the time series of the input chirp signal (the I/Q signal) inputted from the A/D converter 19 to the pulse compression filter 40 is written as the following vector:

$$\vec{A} = (a_1, a_2, \ldots, a_N), \quad (1)$$

called first input vector. Here the vector components $a_1, \ldots, a_N$ are the I/Q sampled data of an input chirp pulse in order of range (distance). They correspond to the sampled values of the input chirp pulse at each range.

Then, the filtering coefficient vector $\vec{H}$ of the pulse compression filter 40 (the FIR filter with N taps shown in FIG. 4) is written as $$\vec{H} = (h_1, h_2, \ldots, h_N) \quad (2)$$
$$= (w_1 C_1, w_2 C_2, \ldots, w_N C_N)$$
$$= \vec{C} W, \ldots$$

called third coefficient vector, where $$\vec{C} = (C_1, C_2, \ldots, C_N) = (a_N^*, a_{N-1}^*, \ldots, a_1^*), \quad (3)$$

$$W = \begin{bmatrix} w_1 & & O \\ & w_2 & \\ & & \ddots \\ O & & w_N \end{bmatrix} = diag(W). \quad (4)$$

Here C represents the filtering coefficient vector of an matched filter, called forth coefficient vector, W a weight matrix, corresponding to a window function, which is a diagonal matrix having N×N elements, the mathematical symbol "*" the complex conjugate of vector components, the mathematical symbol "diag" the diagonal matrix.

Then, the time series of the output pulse signal outputted from the pulse compression filter 40 to the DFT processor 21 is represented by the following vector:

$$\vec{y} = (y_1, y_2, \ldots, y_{2N-1}) = \vec{H}X^T = \vec{C}WX^T, \quad (5)$$

called first output vector, where $$X = \begin{bmatrix} a_1 & & & O \\ a_2 & a_1 & & \\ \vdots & & \ddots & \\ a_N & a_{N-1} & \cdots & a_1 \\ & a_N & & a_2 \\ & & \ddots & \vdots \\ O & & & a_N \end{bmatrix} \Big\} 2N-1. \quad (6)$$

Here X represents the state matrix, having N×(2N−1) elements, of the input chirp signal inputted in each delay element (D) of the FIR filter (the pulse compression filter 40), and the mathematical symbol "T" the transverse matrix of a matrix.

Substituting (2)–(4) and (6) into the equation (5), we obtain $$y = \overbrace{(w_1 a_N^* a_1, w_1 a_N^* a_2 + w_2 a_{N-1}^* a_1, \\ w_1 a_N^* a_3 + w_2 a_{N-1}^* a_2 + w_3 a_{N-2}^* a_3, \ldots, w_N a_1^* a_N)}^{2N-1}. \quad (7)$$

As can be expected from (7), each component of the first output vector $\vec{y}$ is composed of the expectation value of the correlation of the components $a_1, \ldots, a_N$ of the first input vector $\vec{A}$. Therefore, this first output vector $\vec{y}$ is called correlation output or compression filter output.

[Formulation of Pulse Compression Processing in Frequency Space]

The pulse compression processing has recently tended to be executed more in the frequency space that is the spectral space of the real space than in the real space that the correlation processing shown in (1)–(5) is implemented. In particular, for improving the processing efficiency, the pulse compression processing in the frequency space deals with the sampled series of an input data sequence having longer length ($N_f$) than that (N) of the sampled series given by (1). Further, in many cases, the sampled series of the input data sequence is directly calculated by the A/D transformation processing with a high sampling frequency in order to meet the requirement of wide dynamics range and others. This means that fine sampled data having longer length than that of the minimum sampled data equivalent to pulse compression ratio is inputted in the pulse compression filter 40.

Under such a tendency, the zero sidelobe calculator 32 deals with frequency spectrum in the frequency space obtained by applying the Fast Fourier Transformation (FFT) to new input and output vectors $\vec{A}_z$, $\vec{y}_z$ of the real space, called second input and output vectors, instead of the first input and output vectors $\vec{A}$, $\vec{y}$ of the real space, that is:

$$\underset{\vec{y} = \vec{H}X^T}{\text{vector in real space}} \quad (5)$$

$$\underset{\text{Fast Forier Tansformation}}{\overset{\Rightarrow}{\underset{\Leftarrow}{\text{Inverse Fast Fourier Transformation}}}} \underset{Q\vec{y}_z^T = Q(\vec{H}_z X_z^T) = QX_z\vec{H}_z^T}{\text{vector in frequency space}} \text{ where} \quad (7)$$

$$Q = \begin{bmatrix} q_{11} & \cdots & q_{1N_f} \\ \vdots & \ddots & \vdots \\ q_{N_f 1} & \cdots & q_{N_f N_f} \end{bmatrix}, \quad (8)$$

$$q_{nk} = e^{-j\frac{2\pi}{N_f}(n-1)(k-1)}, \quad (9)$$

$$\vec{y}_z = (y_1, y_2, \cdots y_{2N-1}, \overbrace{0, \cdots, 0}^{N_f-(2N-1)}) \equiv (\vec{y}, \overbrace{0, \cdots, 0}^{N_f-(2N-1)}), \quad (10)$$

$$\vec{H}_z = (h_1, h_2, \cdots h_N, \overbrace{0, \cdots, 0}^{N_f-N}) \equiv (\vec{H}, \overbrace{0, \cdots, 0}^{N_f-N}), \quad (11)$$

$$X_z = \begin{bmatrix} X & O \\ O & O \end{bmatrix} \Big\} N_f - (2N-1), \quad (12)$$

$$\vec{A}_z = (a_1, a_2, \cdots a_N, \overbrace{0, \cdots, 0}^{N_f-N}) \equiv (\vec{A}, \overbrace{0, \cdots, 0}^{N_f-N}), \quad (13)$$

$$\vec{C}_z = (C_1, C_2, \cdots, C_N, \overbrace{0, \cdots, 0}^{N_f-N}) \equiv (\vec{C}, \overbrace{0, \cdots, 0}^{N_f-N}). \quad (14)$$

Here Q represents the FFT matrix, n,k the positive integers from 1 to $N_f$, $N_f$ the numbers of the sampled point of the FFT, $\vec{y}_z$ the second output vector made by adding $N_f-(2N-1)$ zero components to the first output vector $\vec{y}$ given by the equation (5), $\vec{H}_z$ a fourth coefficient vector made by adding $N_f-N$ zero components to the third coefficient vector $\vec{H}$ given by (2), $\vec{A}_z$ the second input vector made by adding $N_f-N$ zero components to the first input vector $\vec{A}$ given by (1), and $\vec{C}_z$ the new filtering coefficient vector of the matched filter made by adding $N_f-N$ zero components to the fourth coefficient vector $\vec{C}$ given by (3). This new filtering coefficient vector $\vec{C}_z$ is called fifth coefficient vector. As described above, the number ($N_f$) of the sampled series of the FFT is more than that (2N−1) of sampled series of the output signal outputted from the pulse compression filter 40. Since the pulse compression processing in the frequency space via the FFT can treat wide sweep range, this favors normal radar systems.

Substituting (8)–(14) into the equation (7), we obtain $$Q\vec{y}_z^T = QX_z\vec{H}_z^T = QX_zE\vec{H}_z^T = QX_z(\hat{Q}Q)\vec{H}_z^T = (QX_z\hat{Q})(Q\vec{H}_z^T) \quad (15)$$

$$= \begin{bmatrix} (Q\vec{A}_z^T)_1 & \cdots & O \\ \vdots & \ddots & \vdots \\ O & \cdots & (Q\vec{A}_z^T)_1 \end{bmatrix}(Q\vec{H}_z^T)$$

$$= diag(Q\vec{A}_z^T)(Q\vec{H}_z^T)$$

where $$\hat{Q} \equiv \frac{Q^*}{N_f}. \quad (16)$$

Here $\hat{Q}$ represents the Inverse FFT (IFFT) matrix of the FFT matrix Q satisfying the following normalization condition:

$$Q\hat{Q}=E \quad (17)$$

where E is the unit matrix.

Under the assumption described above, a third output vector $\vec{y}_{mz}$ satisfying the sidelobe free condition is defined as follows:

$$\vec{y}_{mz} = (0, \cdots 0, y_{N-Nx}, \cdots, y_N, \cdots, y_{N+Nx}, 0, \cdots, 0, \overbrace{0, \cdots, 0}^{N_f-(rN-1)}) \quad (18)$$

$$\equiv (\vec{y}_m, \overbrace{0, \cdots, 0}^{N_f-(2N-1)})$$

$$\equiv \vec{H}_{dz}H_z^T$$

where $$\vec{y}_m = (0, \ldots 0, y_{N-Nx}, \ldots, y_N, \ldots, y_{N+Nx}, 0, \ldots, 0). \quad (19)$$

Here $\vec{H}_{dz}$ represents the first coefficient vector of the present invention described above. The third output vector $\vec{y}_{mz}$ satisfies the condition that remains samples $y_{N-Nx}, \ldots, y_N, \ldots, y_{N+Nx}$ in a vicinity of the peak sample $y_N$ in the time series of the output signal represented by the equation (5) while reducing other samples to zero.

Multiplying both hand sides of the equation (18) by the FFT matrix Q from the left, with reference to the equation (15), we get $$Q\vec{y}_{mz}^T = QX_z\vec{H}_{dz}^T \quad (20)$$

$$= (QX_z\hat{Q})(Q\vec{H}_{dz}^T)$$

$$= diag(Q\vec{A}_z^T)(Q\vec{H}_{dz}^T).$$

Further, multiplying both hand sides of the equation (20) by the diagonal matrix $[diag(Q\vec{A}_z^T)]^{-1}$ from the left, we obtain $$Q\vec{H}_{dz}^T[diag(Q\vec{A}_z^T)]^{-1}Q\vec{y}_{mz}^T. \quad (21)$$

Furthermore, multiplying both hand sides of the equation (21) by the IFFT matrix $\hat{Q}$ from the left, we finally obtain the following equation:

$$\vec{H}_{dz}^T = \hat{Q}(Q\vec{H}_{dz}^T) \quad (22)$$

$$= \hat{Q}[diag(Q\vec{A}_z^T)]^{-1}Q\vec{y}_{mz}^T$$

$$= \hat{Q}BQ\vec{y}_{mz}^T$$

where $$B = \begin{bmatrix} \frac{1}{(Q\vec{A}_z^T)_1} & \cdots & O \\ \vdots & \ddots & \vdots \\ O & \cdots & \frac{1}{(Q\vec{A}_z^T)_{N_f}} \end{bmatrix}. \quad (23)$$

The equation (22) shows that the first coefficient vector $\vec{H}_{dz}$ satisfying the sidelobe free condition is determined by the third output vector $\vec{y}_{mz}$ given by the equation (18). Further, as is easily understood from the above discussion, the third output signal $\vec{y}_{mz}$ is determined by the fourth coefficient vector $\vec{H}_z$. From this, we can find that the first coefficient vector $\vec{H}_{dz}$ is determined by the fourth coefficient vector $\vec{H}_z$.

In the present invention, the zero sidelobe calculator 32 outputs the first coefficient vector $\vec{H}_{dz}$ given by the equation (22) to the pulse compression filter 40.

Although in this way the first coefficient vector $\vec{H}_{dz}$ satisfying the sidelobe free condition is calculated by the pulse compression processing described above, such a pulse compression processing is generally affected by large S/N loss under background noise.

Therefore, next let us derivate a condition for minimizing S/N loss with the sidelobe free described above.

[Condition for Minimizing S/N Loss with the Sidelobe Free]

The average power of the first input signal $\vec{A}$ given by (1) inputted in the pulse compression filter 40 is defined as $$S_{in} = \frac{\vec{A} \cdot (\vec{A}^T)^*}{N} \quad (24)$$

where N is the number of the sampled series of the first input signal $\vec{A}$ given by (1), and the mathematical symbol "·" the inner product of vectors.

The average power of the noise introduced in the first input signal $\vec{A}$ given by (1) inputted in the pulse compression filter 40 is written as $$N_{in} = \sigma^2. \quad (25)$$

Here we assume that the noise introduced in each sample of the input chirp signal is uncorrelated. This assumption means that the sampled series of an input chirp signal is sampled with a frequency equivalent to noise bandwidth, namely the sampled series of the noise introduced in the input chirp signal is sampled with equal or higher frequency than that of the chirp input signal.

The peak value of the power of the third output signal $\vec{y}_{mz}$ given by the equation (18) outputted from the pulse compression filter 40 is defined as $$S_{out} = (\vec{C}_z^* \cdot \vec{H}_{dz}^T)\{(\vec{C}_z^* \cdot \vec{H}_{dz}^T)^T\}^* \quad (26)$$
$$= (\vec{C}_z^* \cdot \vec{H}_{dz}^T)(\vec{H}_{dz}^* \cdot \vec{C}_z^T),$$

and the average power of the noise introduced in the third output signal $\vec{y}_{mz}$ given by the equation (18) outputted from the pulse compression filter 40 is defined as $$N_{out} = \{\vec{H}_{dz} \cdot (\vec{H}_{dz}^T)^*\}\sigma^2. \quad (27)$$

Further, the peak value of the power of an output signal outputted from a pulse compression filter with a matched filter is represented as $$S_0 = (\vec{C}_z^* \cdot \vec{C}_z^T)\{(\vec{C}_z^* \cdot \vec{C}_z^T)^T\}^* \quad (28)$$
$$= (\vec{C}_z^* \cdot \vec{C}_z^T)(\vec{C}_z^* \cdot \vec{C}_z^T),$$

and the average power of the noise introduced in the output signal outputted from the pulse compression filter with the matched filter is represented as $$N_0 = \{\vec{C}_2 \cdot (\vec{C}_2^T)^*\}\sigma^2. \quad (29)$$

Then, the index L of S/N loss is defined as follows:

$$L \equiv \frac{\left(\frac{S_{out}/N_{out}}{S_{in}/N_{in}}\right)}{\left(\frac{S_0/N_0}{S_{in}/N_{in}}\right)} \quad (30)$$
$$= \frac{S_{out}}{N_{out}} \times \frac{N_0}{S_0}.$$

Substituting (24)–(29) into the definition (30) of the index L, we obtain $$L = \frac{S_{out}}{N_{out}} \cdot \frac{N_0}{S_0} \quad (31)$$
$$= \frac{(\vec{C}_z^* \cdot \vec{H}_{dz}^T)(\vec{H}_{dz}^* \cdot \vec{C}_z^T)}{\{\vec{H}_{dz} \cdot (\vec{H}_{dz}^T)^*\}\sigma^2} \times \frac{\{\vec{C}_z \cdot (\vec{C}_z^T)^*\}\sigma^2}{(\vec{C}_z^* \cdot \vec{C}_z^T)(\vec{C}_z^* \cdot \vec{C}_z^T)}$$
$$= \frac{(\vec{C}_z^* \cdot \vec{H}_{dz}^T)(\vec{H}_{dz}^* \cdot \vec{C}_z^T)}{\vec{H}_{dz} \cdot (\vec{H}_{dz}^T)^*} \times \frac{1}{\vec{C}_z \cdot (\vec{C}_z^T)^*}.$$

$$(\because \vec{C}_z^* \cdot \vec{C}_z^T = \vec{C}_z \cdot (\vec{C}_z^T)^*).$$

The index L indicates that the more its value is close to 1, the more S/N loss decreases.

Since it is difficult to analytically derive the condition for minimizing S/N loss from (31), we use the following identity:

$$\vec{H}_{dz}^T = \hat{Q} B Q \vec{y}_{mz}^T \quad (32)$$
$$= \hat{Q} B Q X_{mz} \vec{H}_z^T \quad (\because \text{Eq. (18)})$$
$$= u \vec{H}_z^T$$
$$\leftrightarrow \vec{H}_{dz} = \vec{H}_z u^T$$

where $$u \equiv \hat{Q} B Q X_{mz} = \frac{Q^* B Q X_{mz}}{N_f}, \quad (\because \text{Eq. (16)}) \quad (33)$$

$$X_{mz} = \begin{bmatrix} X_m & O \\ O & O \end{bmatrix} \} N_f - (2N-1), \quad (34)$$

$$\overbrace{\phantom{XXXXXXXXXXXXXXXXXXXXXXX}}^{N_f - N} \quad (34)$$

$$X_m = \begin{bmatrix} O & & & & O & & O \\ a_{N-Nx} & \cdots & & \cdots & a_1 & & \\ \vdots & & \ddots & & & & \\ a_N & \cdots & & \cdots & \cdots & a_1 & \\ & \ddots & & & & \vdots & \\ & & a_N & \cdots & & \cdots & a_{Nx+1} \\ O & & & & & & O \end{bmatrix} \} 2N-1. \quad (35)$$

Here $X_m$ is the new state matrix, having $N \times (2N-1)$ elements, of the input signal inputted in each delay element (D) of the FIR filter (the pulse compression filter 40).

Then, (31) is further modified to the quadratic form of the fourth coefficient vector $\vec{H}_z$ by using the equation (32) as follows:

$$L = \frac{(\vec{C}_z^* \cdot \vec{H}_{dz}^T)(\vec{H}_{dz}^* \cdot \vec{C}_z^T)}{\vec{H}_{dz} \cdot (\vec{H}_{dz}^T)^*} \times \frac{1}{\vec{C}_z \cdot (\vec{C}_z^T)^*} \quad (36)$$
$$= \frac{\{\vec{C}_z^* \cdot (u\vec{H}_z^T)\}[\{(u\vec{H}_z^T)^T\}^* \cdot \vec{C}_z^T]}{(\vec{H}_z u^T) \cdot (u\vec{H}_z^T)^*} \times \frac{1}{\vec{C}_z \cdot (\vec{C}_z^T)^*}$$
$$= \frac{\{(\vec{C}_z^* u) \cdot \vec{H}_z^T\}[\{(\vec{C}_z^* u)\vec{H}_z^T\}^T]^*}{\vec{H}_z u^T u^* (\vec{H}_z^T)^*} \times \frac{1}{\vec{C}_z \cdot (\vec{C}_z^T)^*}.$$

Further, substituting the following equation (37) into (36):

$$u^T u^* = (\hat{Q} B Q X_{mz})^T (\hat{Q} B Q X_{mz})^* \quad (37)$$
$$= X_{mz}^T Q^T B^T (\hat{Q}^T \hat{Q}^*) B^* Q^* X_{mz}^*$$
$$= \frac{X_{mz}^T Q^T B^T B^* Q^* X_{mz}^*}{N_f}, \left(\because \hat{Q}^T \hat{Q}^* = \frac{(Q^*)^T}{N_f} \cdot \frac{Q}{N_f} = \frac{E}{N_f}\right)$$

we get $$L = \frac{\{(\vec{C}_z^* u) \cdot \vec{H}_z^T\}[\{(\vec{C}_z^* u) \cdot \vec{H}_z^T\}^T]^*}{\vec{H}_z \{X_{mz}^T (Q^T B^T B^* Q^*) X_{mz}^*\}(\vec{H}_z^T)^*} \times \frac{N_f}{\vec{C}_z \cdot (\vec{C}_z^T)^*}. \quad (38)$$

Furthermore, substituting the following definitions (39)–(41) into (38):

$$\vec{v} \equiv \vec{C}_z^* u, \quad (39)$$

$$z \equiv X_{mz}^T (Q^T B^T B^* Q^*) X_{mz}^*, \quad (40)$$

$$\beta \equiv \frac{N_f}{\vec{C}_z \cdot (\vec{C}_z^T)^*}, \text{ we get} \quad (41)$$

$$L = \frac{(\vec{v} \cdot \vec{H}_z^T)\{(\vec{v} \cdot \vec{H}_z^T)^T\}^*}{\vec{H}_z z (\vec{H}_z^T)^*} \beta. \quad (42)$$

Further, substituting the new vectors $\vec{F}$, $\vec{G}$ defined as follows:

$$\vec{F} \equiv \vec{v}(z^{1/2})^*, \quad (43)$$

$$\vec{G} \equiv \vec{H}_z^*(z^{1/2})^* \Leftrightarrow (\vec{G}^T)^* = (z^{1/2})^* \vec{H}_z^T, \quad (44)$$

into (42), we obtain $$L = \frac{\{\vec{F} \cdot (\vec{G}^T)^*\}[\{\vec{F} \cdot (\vec{G}^T)^*\}^T]^*}{\vec{G}^* \cdot \vec{G}^T} \beta. \quad (45)$$

Applying the Schwartz inequality:

$$\{\vec{F} \cdot (\vec{G}^T)^*\}[\{\vec{F} \cdot (\vec{G}^T)^*\}^T]^* \leq \{\vec{F} \cdot (\vec{F}^T)^*\}\{\vec{G} \cdot (\vec{G}^T)^*\} \quad (46)$$

to (45), we can estimate the index L of S/N loss, that is (45), as the following inequality:

$$L = \frac{\{\vec{F} \cdot (\vec{G}^T)^*\}[\{\vec{F} \cdot (\vec{G}^T)^*\}^T]^*}{\vec{G}^* \cdot \vec{G}^T} \beta \leq \frac{\{\vec{F} \cdot (\vec{F}^T)^*\}\{\vec{G} \cdot (\vec{G}^T)^*\}}{\vec{G}^* \cdot \vec{G}^T} \beta \quad (47)$$

$$= \{F \cdot (F^T)^*\}\beta$$

$$= [v(z^{-\frac{1}{2}})^* \cdot \{(z^{-\frac{1}{2}})^*(v^T)^*\}]\beta \; (\because \text{Eq. (43)}, z^* = z^T)$$

$$= \{v(z^{-1})^*(v^T)^*\}\beta.$$

The condition having quality in the inequality (47) is $$\alpha \vec{F} = \vec{G}, \quad (48)$$

where $\alpha$ is arbitrary constant of complex number.

Thus, substituting the definitions (43) and (44) into the condition (48), we get $$\alpha \vec{v}(z^{-1/2}) = \vec{H}_z^*(z^{1/2})^*, \quad (49)$$

and further multiplying both hand sides of the equation (49) by the matrix $(z^{1/2})^*$ from right, we get $$\alpha \vec{v} = \vec{H}_z^* z^* = \alpha \vec{C}_z^* u, \; (\because \text{Eq. (39)}) \quad (50)$$

furthermore multiplying both hand sides of the equaiton (50) by the matrix $(z^{-2})^*$ from the right, we finally obtain $$\vec{H}_z^* = \alpha(\vec{C}_z^* u)(z^{-1})^*, \quad (51)$$

$$\therefore \vec{H}_z = \alpha^* \vec{C}_z u^* z^{-1} \equiv \vec{H}_{zM}. \quad (52)$$

The equation (52) is the condition for minimizing S/N loss. From this, we can find that the first coefficient vector $\vec{H}_{dz}$ given by the equation (32) with the second coefficient vector $\vec{H}_{zM}$ as the fourth coefficient vector $\vec{H}_z$ given by the equation (52) satisfies the sidelobe free with minimum S/N loss.

In the present invention, the minimun S/N calculator 31 calculates the fourth coefficient vector $\vec{H}_z$ (i.e. the second coefficient vector $\vec{H}_{zM}$) represented by the equation (52), resulting in transmitting the fourth coefficient vector $\vec{H}_z$ (i.e. the second coefficient vector $\vec{H}_{zM}$) to the zero sidelobe calculator 32. Next, the zero sidelobe calculator 32 substitutes the fourth coefficient vector $\vec{H}_z$ (i.e. the second coefficient vector $\vec{H}_{zM}$) into the first coefficient vector $\vec{H}_{dz}$ represented by the equation (32), resulting in the first coefficient vector $\vec{H}_{dz}$ satisfying the sidelobe free with minimum S/N loss to the pulse compression filter 40.

<Second Embodiment>

In the first embodiment of the present invention described above, as shown in FIG. 3, the output quantities transmitted to the pulse compressing filter (the FIR filter) 40 are the input signal $\vec{A}$ given by (1) and the first coefficient vector $\vec{H}_{dz}$ given by the equation (32).

As is easily understood, these quantities belong to the real space. Namely, in the first embodiment of the present invention, the operating processes in the frequency space are executed only in the filtering coefficient calculator 30, that is, the minimum S/N loss calculator 31 and zero sidelobe calculatior 32.

The second embodiment of the present invention permits the pulse compression processing to be executed in the frequency space.

Figure 5A:
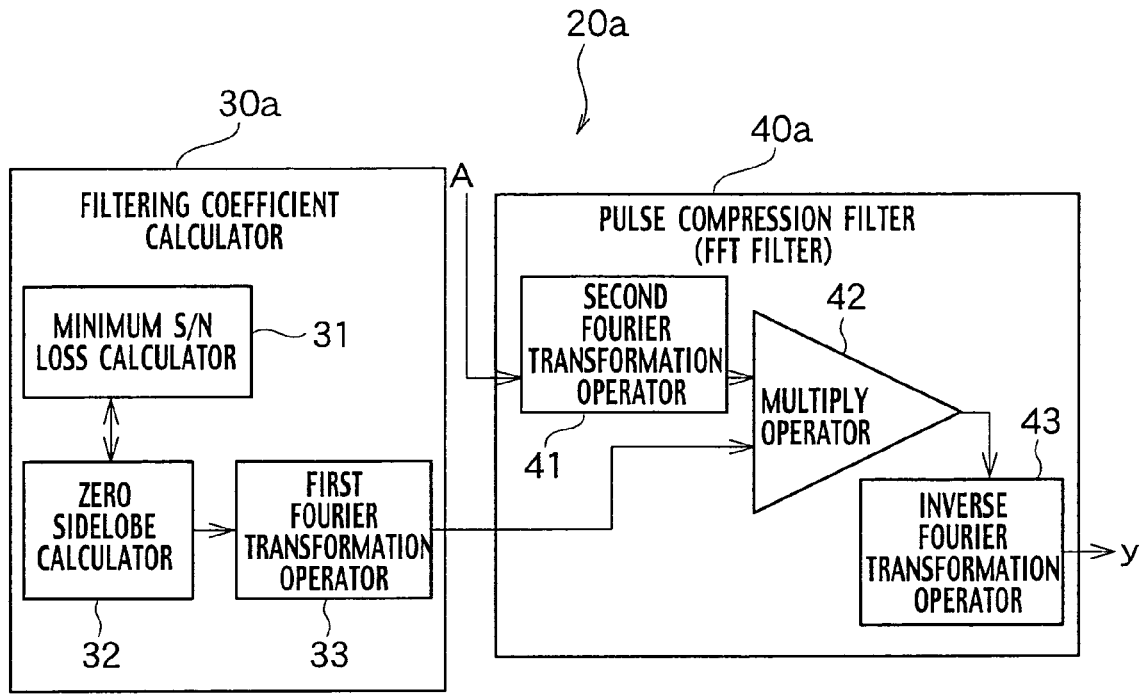
FIG. 5A is a functional block diagram showing the first example of a pulse compression processor according to the second embodiment of the present invention.
Figure 5B:
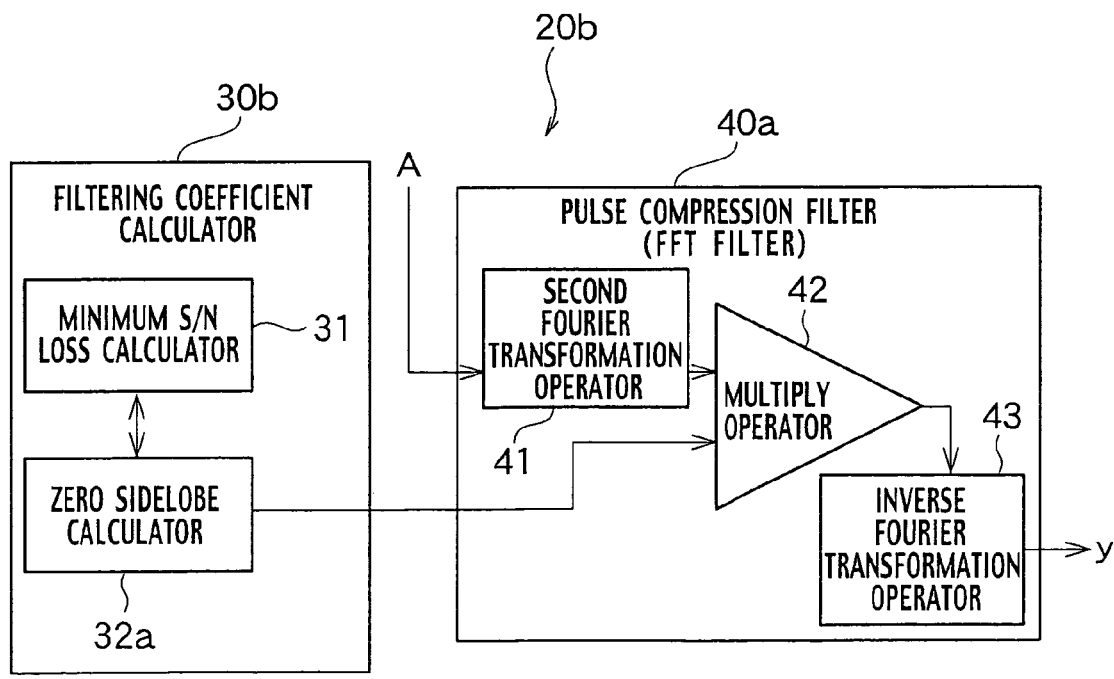
FIG. 5B is a functional block diagram showing the second example of a pulse compression processor according to the second embodiment of the present invention.

Let us explain the schematic construction of the pulse compression processor according to the second embodiment of the present invention with reference to FIGS. 5A and 5B.

FIG. 5A is a functional block diagram showing the first example of a pulse compression processor according to the second embodiment of the present invention. Hereinafter, the same component parts as those of the first embodiment bear the same reference numbers for describing differences from the first embodiment.

The pulse compression processor 20a of the first example of the second embodiment comprises a filtering coefficient calculator 30a, a pulse compression filter 40a.

The filtering coefficient calculator 30a comprises a minimum S/N loss calculator 31, a zero sidelobe calculator 32, and a first Fourier transformation operator 33. This filtering coefficient calculator 30a calculates the filtering coefficient vector of the frequency space given in the pulse compression filter 40a. The details are as follows:

The minimum S/N loss calculator 31 calculates the second coefficient data as the second coefficient vector $\vec{H}_{zM}$ given by the equation (52) that theoretically minimizes S/N loss.

The zero sidelobe calculator 32 calculates the first coefficient data as the first coefficient vector $\vec{H}_{dz}$ given by the equation (32) for reducing sidelobe level to zero (the sidelobe free), based on the second coefficient vector $\vec{H}_{zM}$ calculated by the minimum S/N loss calculator 31, resulting in transmitting the first coefficient vector $\vec{H}_{dz}$ to the first Fourier transformation operator 33.

The operating processes of the minimum S/N loss calculator 31 and the zero sidelobe calculator 32 are executed in the same manner as the first embodiment of the present invention.

The first Fourier transformation operator 33 generates the transformed coefficient vector $Q\vec{H}_{dz}^{T}$ of the frequency space, called spectral first coefficient vector, by operating the fast Fourier transformation Q given by (8) to the first coefficient vector $\vec{H}_{dz}$ of the real space, resulting in transmitting the spectral first coefficient vector $Q\vec{H}_{dz}^{T}$ of the frequency space to the pulse compression filter 40a.

As shown in FIG. 5A, the pulse compression filter 40a includes a second Fourier transformation operator 41, a multiply operator 42, and an inverse Fourier transformation operator 43.

The second Fourier transforming operator 41 generates the transformed input signal $Q\vec{A}_{z}^{T}$ of the frequency space, called spectral first input vector, by operating the fast Fourier transformation Q given by (8) to the second input vector $\vec{A}_{z}$ of the real space, resulting in transmitting the spectral second input signal $Q\vec{A}_{z}^{T}$ to the multiply operator 42.

The multiply operator 42 compresses the spectral second input vector $Q\vec{A}_{z}^{T}$ transmitted from the second Fourier transformation operator 41, based on the spectral second coefficient vector $Q\vec{H}_{dz}^{T}$ transmitted from the first Fourier transformation operator 33, resulting in transmitting the compressed signal $Q\vec{y}_{mz}^{T}$ of the frequency space to the inverse Fourier transformation operator 43, by using the equations (32) and (23).

The inverse Fourier transforming operator 43 generates the output signal $\vec{y}_{mz}$ ($\vec{y}_{mz}^{T}$) of the real space, that is, the time domain data of the output signal, by operating the inverse fast Fourier transformation Q given by (16) to the compressed signal $Q\vec{y}_{mz}^{T}$ of the frequency space, that is, the frequency domain data of the output signal, resulting in outputting the output signal $\vec{y}_{mz}$ of the real space, which is equivalent to the first embodiment of the present invention, to the discrete Fourier transforming operator 21.

FIG. 5B is a schematic block diagram showing the second example of a pulse compression processor according to the second embodiment of the present invention. Hereinafter, the same component parts as those of the first embodiment bear the same reference numbers for describing differences from the first embodiment.

The pulse compression processor 20b of the second example of the second embodiment comprises a filtering coefficient calculator 30b, a pulse compression filter 40a.

The filtering coefficient calculator 30a is comprised of a minimum S/N loss calculator 31, a zero sidelobe calculator 32a. This filtering coefficient calculator 30a calculates the filtering coefficient vector of the frequency space given in the pulse compression filter 40a. The details are as follows:

The minimum S/N loss calculator 31 calculates the transformed coefficient data as the second coefficient vector $\vec{H}_{zM}$ given by the equation (52) that theoretically minimizes S/N loss.

The zero sidelobe calculator 32a calculates the first coefficient data as a first coefficient vector $Q\vec{H}_{dz}$ of the frequency space, called spectral first coefficient vector, given by the equation (21) for reducing sidelobe level to zero (the sidelobe free), based on the second coefficient vector $\vec{H}_{zM}$ calculated by the minimum S/N loss calculator 31, resulting in transmitting the spectral first coefficient vector $Q\vec{H}_{dz}$ of the frequency space to the second Fourier transformation operator 41.

The pulse compression filter 40a includes a second Fourier transformation operator 41, a multiply operator 42, and an inverse Fourier transforming operator 43.

The second Fourier transforming operator 41 generates the transformed input signal $Q\vec{A}_{z}^{T}$ of the frequency space, called spectral first input vector, by operating the fast Fourier transformation Q given by (8) to the second input vector $\vec{A}_{z}$ of the real space, resulting in transmitting the spectral second input signal $Q\vec{A}_{z}^{T}$ to the multiply operator 42.

The multiply operator 42 compresses the spectral second input vector $Q\vec{A}_{z}^{T}$ transmitted from the second Fourier transformation operator 41, based on the spectral second coefficient vector $Q\vec{H}_{dz}^{T}$ transmitted from the zero sidelobe calculator 32a, resulting in transmitting the compressed signal $Q\vec{y}_{z}^{T}$ of the frequency space to the inverse Fourier transformation operator 43, by using the equations (32) and (23).

The inverse Fourier transforming operator 43 generates the output signal $\vec{y}_{mz}$ ($\vec{y}_{mz}^{T}$) of the real space, that is, the time domain data of the output signal, by operating the inverse fast Fourier transformation Q given by (16) to the compressed signal $Q\vec{y}_{mz}^{T}$ of the frequency space, that is, the frequency domain data of the output signal, resulting in outputting the output signal $\vec{y}_{mz}^{T}$ of the real space, which is equivalent to the first embodiment of the present invention, to the discrete Fourier transforming operator 21.

Simulation of Pulse compression Processing with Sidelobe Free Condition

Finally, let us provide simulations of pulse compression under the condition of the sidelobe free with minimum S/N loss (that is, the first coefficient vector $\vec{H}_{dz}$ given by the equation (32) with the second coefficient vector $\vec{H}_{zM}$ given by the equation (52) satisfies the sidelobe free with minimum S/N loss) obtained from the first and second embodiments of the present invention.

Figure 6:
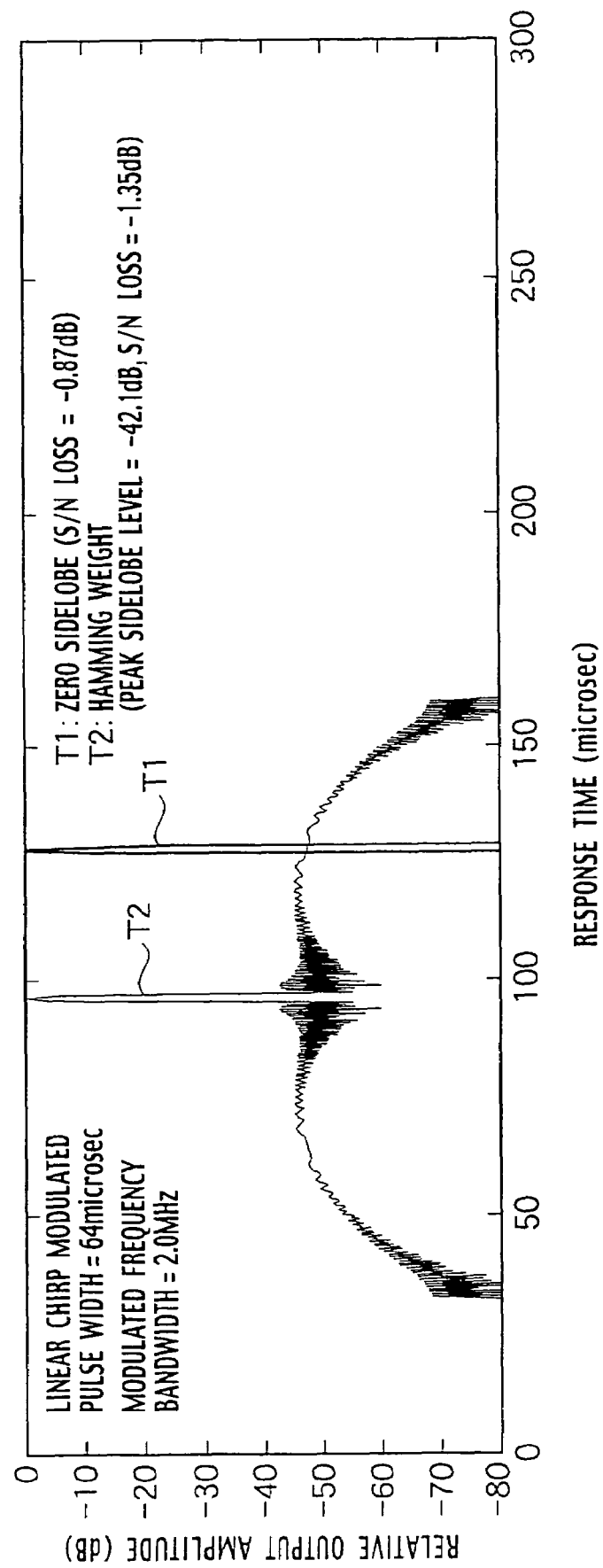
FIG. 6 is a graph showing a simulation of pulse compression executed by a pulse compression processor according to the first and second embodiments of the present invention.
Figure 7:
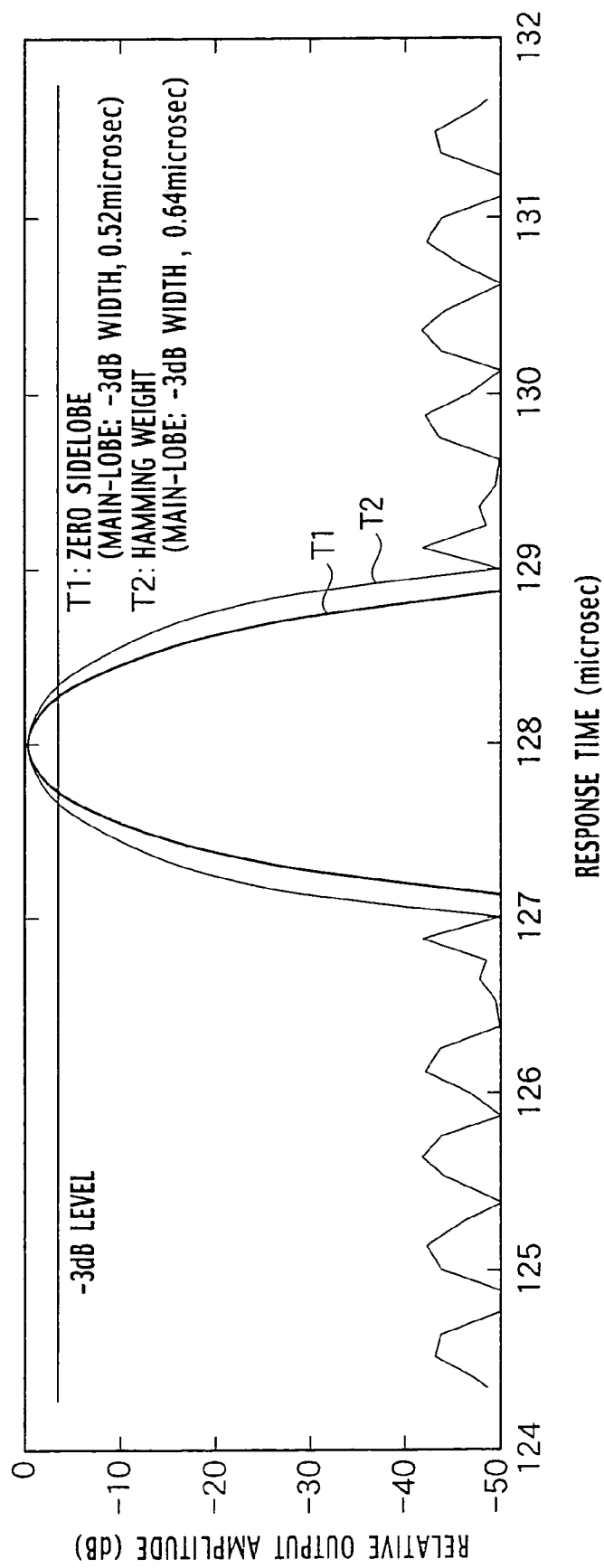
FIG. 7 is an enlarged graph showing a simulation of pulse compression executed by a pulse compression processor according to the first and second embodiments of the present invention.

FIG. 6 is a graph showing a simulation of pulse compression executed by a pulse compression processing circuit according to the first and second embodiments of the present invention, and FIG. 7 is an enlarged graph showing a simulation of pulse compression executed by a pulse compression processing circuit according to the first and second embodiments of the present invention.

The parameters for these simulations are set as follows: the linear chirp modulated pulse width=64 microsec; the modulated frequency bandwidth=2.0 MHz.

In FIGS. 6 and 7, T1 shows pulse compressed waveforms outputted from the pulse compression processor according to the first and second embodiments of the present invention, and T2 shows pulse compressed waveforms outputted from a conventional pulse compression processor with the hamming window function, which is typical one.

As shown in FIG. 6, in the pulse compressed waveforms outputted from the pulse compression processor of the present invention, the sampled values in the region without a vicinity of main-lobe, i.e. the value of the sidelobe, is reduced to zero, further, the S/N loss in the peak value of the main-lobe is small, and furthermore, main-lobe width is narrow in comparison with these of the conventional pulse compression processor.

Further, FIG. 7 compares the pulse compressed waveforms outputted from the pulse compression processor of the present invention with these of the conventional pulse compression processor, based on the 3 dB main-lobe width. As shown in FIG. 7, the pulse compression method of the present invention enable the 3 dB main-lobe width to be narrow as well as enable the S/N loss to be small in comparison with the conventional pulse compression method. This shows that the pulse compression processor of the present invention can realize more higher resolution and sensitivity that that of the conventional pulse compression processor.

Finally, we should note as the following information:

(1) Although the first and second embodiments of the present invention focus on the linear chirp pulse signal as the modulated pulse signal, the condition for the sidelobe free with minimum S/N loss, in other words, the relational expressions (1)–(52), of the present invention may have applicability to other modulated pulse signals as transmission signal transmitted from a transmitter such as nonlinear chirp pulse signals, discrete phase code modulated pulse signals and more.

(2) Although the simulations shown in FIGS. 6 and 7 are implemented with the linear chirp pulse signal, these results are independent of kinds of modulated pulse signals, as is easily understood from the relational expressions (1)–(52).

(3) As is easily understood from the relational expressions (1)–(52), the condition for the sidelobe free with minimum S/N loss is independent of the various conditions of input and output signal.

It is also to be noted that, besides those already mentioned above, many modifications and variations of the above embodiments may be made without departing from the novel and advantageous features of the present invention. Accordingly, all such modifications and variations are intended to be included within the scope of the appended claims.

The present disclosure relates to subject matter contained in Japanese Patent Application No. 2003-342153, filed on Sep. 30, 2003, the disclosure of which is expressly incorporated herein by reference in its entirely.

What is claimed is:

1. A pulse compression processor compressing a modulated pulse signal correlately received by a receiver, comprising:
a coefficient calculator including
a minimum S/N loss calculator that calculates a set of first filtering coefficients, that minimizes S/N loss in a peak value of a main-lobe of a compressed pulse signal, and
a zero sidelobe calculator that calculates a set of second filtering coefficients that converts sampled output signal values outside a vicinity of the main-lobe into zero based on the set of the first filtering coefficients; and
a pulse compression filter that compresses the modulated pulse signal based on the set of the second filtering coefficients calculated by the coefficient calculator.

2. The pulse compression processor according to claim 1, wherein the modulated pulse signal comprises a signal with a modulated frequency.

3. The pulse compression processor according to claim 2, wherein the pulse signal comprises a linear chirp signal.

4. The pulse compression processor according to claim 2, wherein the pulse signal comprises a nonlinear chirp signal.

5. The pulse compression processor according to claim 1, wherein the pulse signal comprises a signal with modulated phase.

6. The pulse compression processor according to claim 5, wherein the pulse signal comprises a discrete phase code modulated signal.

7. The pulse compression processor according to claim 1, wherein the coefficient calculator calculates the set of the second filtering coefficients as a coefficient vector $\vec{H}_{dz}$ based on the modulated pulse signal as an input vector $\vec{A}=(a_1, a_2, \ldots, a_N)$ and the following relational expressions:

$$\vec{H}_{dz}^T = u\vec{H}_z^T = \hat{Q}BQ\vec{y}_{mz}^T = \hat{Q}BQX_{mz}\vec{H}_z^T \tag{1}$$

where $$\vec{H}_z = \alpha^* \vec{C}_z u^* z^{-1}, \tag{2}$$

$$\vec{C}_z = (a_N^*, a_{N-1}^*, \cdots, a_1^*, \overbrace{0, \cdots, 0}^{N_f - N}) \equiv (\vec{C}, \overbrace{0, \cdots, 0}^{N_f - N}), \tag{3}$$

$$u \equiv \hat{Q}BQX_{mz}, \tag{4}$$

$$Q = \begin{bmatrix} q_{11} & \cdots & q_{1N_f} \\ \vdots & \ddots & \vdots \\ q_{N_f 1} & \cdots & q_{N_f N_f} \end{bmatrix}, \tag{5}$$

$$\hat{Q} = \frac{Q^*}{N_f}, \tag{6}$$

$$q_{nk} = e^{-j\frac{2\pi}{N_f}(n-1)(k-1)}, \tag{7}$$

$$B = \begin{bmatrix} \frac{1}{(Q\vec{A}_z^T)_1} & \cdots & O \\ \vdots & \ddots & \vdots \\ O & \cdots & \frac{1}{(Q\vec{A}_z^T)_{N_f}} \end{bmatrix}, \tag{8}$$

$$X_{mz} = \begin{bmatrix} X_m & \overline{O} \\ O & O \end{bmatrix} \}N_f - (2N-1), \tag{9}$$

-continued $$X_m = \begin{bmatrix} \overbrace{\begin{matrix} O & & & & O \\ a_{N-Nx} & \cdots & & \cdots & a_1 \\ \vdots & & & & \ddots \\ a_N & \cdots & & \cdots & a_1 \\ & \ddots & & & \vdots \\ & & a_N & \cdots & \cdots & a_{Nx+1} \\ O & & & & O \end{matrix}}^{N} \end{bmatrix} \Big\} 2N-1, \quad (10)$$

$$\vec{A}_z = (a_1, a_2, \cdots, a_N, \overbrace{0, \cdots, 0}^{N_f - N}) \equiv (\vec{A}, \overbrace{0, \cdots, 0}^{N_f - N}), \quad (11)$$

here $a_1, \ldots, a_N$ represent sampled values of the modulated pulse signal in order of range; a arbitrary constant of complex number; n, k positive integers from 1 to $N_f$; $N_f$ sampling number of a first Fourier transformation; Nx arbitrary sampling number less than $N_f$; Q a fast Fourier Transformation; $\hat{Q}$ a inverse fast Fourier transformation; symbol "*" complex conjugate; and symbol "T" transverse matrix, and wherein the coefficient calculator transmits the coefficient vector $\vec{H}_{dz}$ to the pulse compression filter.

8. The pulse compression processor according to claim 7, wherein the coefficient calculator comprises:

a first Fourier transformation operator operating the fast Fourier transformation Q to the coefficient vector $\vec{H}_{dz}$, resulting in generating a spectral coefficient vector $Q\vec{H}_{dz}^T$ in frequency space, and wherein the pulse compression filter comprises:

a second Fourier transformation operator operating the fast Fourier transformation Q to the input vector $\vec{A}$, resulting in generating a spectral input vector $Q\vec{A}^T$ in the frequency space;

a multiply operator indirectly compressing the spectral input vector $Q\vec{A}^T$ generated by the second Fourier transformation operator, based on the spectral coefficient vector $Q\vec{H}_{dz}^T$ generated by the first Fourier transformation operator, resulting in generating a spectral output vector $Q\vec{y}_{mz}^T$ in the frequency space; and an inverse Fourier transformation operator operating the inverse fast Fourier transformation $\hat{Q}$ to the spectral output vector $Q\vec{y}_{mz}^T$ generated by the multiply operator, resulting in outputting a real output vector $\vec{y}_{mz}$ in real space.

9. The pulse compression processor according to claim 7, wherein the coefficient calculator operating the fast Fourier transformation Q to the coefficient vector $\vec{H}_{dz}$, resulting in generating a spectral coefficient vector $Q\vec{H}_{dz}^T$ in frequency space, and wherein the pulse compression filter includes:

a Fourier transforming operator operating the fast Fourier transformation operation Q to the input vector $\vec{A}$, resulting in generating a spectral input vector $Q\vec{A}^T$ in the frequency space;

a multiply operator indirectly compressing the spectral input signal $Q\vec{A}^T$ generated by the Fourier transforming operator, based on the spectral coefficient vector $Q\vec{H}_{dz}^T$ generated by the coefficient calculator, resulting in generating a spectral output vector $Q\vec{y}_{mz}^T$ in the frequency space; and an inverse Fourier transformation operator operating the inverse fast Fourier transformation $\hat{Q}$ to the spectral output vector $Q\vec{y}_{mz}^T$ generated by the multiply operator, resulting in outputting a real output vector $\vec{y}_{mz}$ in real space.

\* \* \* \* \*